US012762486B2

(12) United States Patent
Zeliger et al.

(10) Patent No.: US 12,762,486 B2
(45) Date of Patent: Oct. 13, 2026

(54) PREDICTING SHOPPER SUPPLY DURING A TIME INTERVAL BASED ON INTERACTIONS BY SHOPPERS WITH A SHOPPER ASSIGNMENT APPLICATION DURING EARLIER TIME INTERVALS

(71) Applicant: Maplebear Inc., San Francisco, CA (US)

(72) Inventors: Soren Zeliger, Oakland, CA (US); Aman Jain, Seattle, WA (US); Zhaoyu Kou, Seattle, WA (US); Ji Chen, Mountain View, CA (US); Trace Levinson, Brooklyn, NY (US); Ganesh Krishnan, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 45 days.

(21) Appl. No.: 19/069,003

(22) Filed: Mar. 3, 2025

(65) Prior Publication Data

US 2025/0200466 A1 Jun. 19, 2025

Related U.S. Application Data

(63) Continuation of application No. 17/731,810, filed on Apr. 28, 2022, now Pat. No. 12,265,933.

(51) Int. Cl.
*G06Q 10/0631* (2023.01)
*G06N 3/02* (2006.01)
(Continued)

(52) U.S. Cl.
CPC ....... *G06Q 10/063116* (2013.01); *G06N 3/02* (2013.01); *G06N 3/084* (2013.01); *G06Q 10/04* (2013.01)

(58) Field of Classification Search
CPC .. G06Q 10/063116; G06Q 10/04; G06N 3/02; G06N 3/084
See application file for complete search history.

(56) References Cited

U.S. PATENT DOCUMENTS

2016/0042315 A1 2/2016 Field-Darragh et al.
2019/0130320 A1 5/2019 Friend, V et al.
(Continued)

FOREIGN PATENT DOCUMENTS

WO WO-2020019237 A1 * 1/2020 ............ G06Q 10/06

OTHER PUBLICATIONS

Real-time Demand Forecasting for an Urban Delivery Platform, Transportation Research Part E: Logistics and Transportation Review 145 (2021) (Year: 2021).*
(Continued)

*Primary Examiner* — Charles Guiliano
(74) *Attorney, Agent, or Firm* — Fenwick & West LLP

(57) ABSTRACT

An online concierge system assigns shoppers to fulfill orders from users. To allocate shoppers, the online concierge system predicts future supply and demand for the shoppers' services for different time windows. To forecast a supply of shoppers, the online concierge system trains a machine learning model that estimates future supply based on access to a shopper mobile application through which the shoppers obtain new assignments by shoppers. The online concierge system also forecasts future orders. The online concierge system estimates a supply gap in a future time period by selecting a target time to accept for shoppers to accept orders and determining a corresponding ratio of number of shoppers and number of orders. The online concierge system may adjust a number of shoppers allocated to the future time period to achieve the determined ratio number of shoppers and number of orders.

20 Claims, 6 Drawing Sheets

(51) Int. Cl.

| | |
|---|---|
| ***G06N 3/084*** | (2023.01) |
| ***G06Q 10/04*** | (2023.01) |

(56) References Cited

U.S. PATENT DOCUMENTS

| | | | | |
|---|---|---|---|---|
| 2020/0410864 | A1 | 12/2020 | Ripert et al. | |
| 2021/0081904 | A1 | 3/2021 | Song | |
| 2021/0125140 | A1 | 4/2021 | Kim et al. | |
| 2021/0142274 | A1* | 5/2021 | Berk | G06Q 50/12 |

OTHER PUBLICATIONS

Hess, A. et al., "Real-time Demand Forecasting for an Urban Delivery Platform," Transportation Research Part E: Logistics and Transportation Review 145, Dec. 7, 2020, pp. 1-20.
Non-Final Rejection Mailed on Jun. 18, 2024 for U.S. Appl. No. 17/731,810, 23 page(s).
PCT International Search Report and Written Opinion, PCT Application No. PCT/US2023/015032, Sep. 19, 2023, 8 pages.

* cited by examiner

PREDICTING SHOPPER SUPPLY DURING A TIME INTERVAL BASED ON INTERACTIONS BY SHOPPERS WITH A SHOPPER ASSIGNMENT APPLICATION DURING EARLIER TIME INTERVALS

CROSS REFERENCE TO RELATED APPLICATIONS

This application is a continuation of co-pending U.S. patent application Ser. No. 17/731,810, filed Apr. 28, 2022, which is incorporated by reference herein in its entirety.

BACKGROUND

This disclosure relates generally to allocating shoppers for fulfilling orders from an online concierge system during a time interval, and more specifically to identifying time intervals where a predicted number of orders exceed fulfillment capacity for a predicted number of shoppers.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Many conventional online concierge systems measure shopper output based on the observed amounts of time that shoppers work when fulfilling orders. Conventional online concierge systems estimate an amount of time to fulfill orders during a time interval and estimate the amounts of time that shoppers are expected to work during the time interval based on previously measured amounts of time worked by shoppers. However, in such configurations, an amount of time worked by shoppers during a time interval is bounded by a number of orders to be fulfilled during the time interval. In such configurations, the amount of time worked by shoppers during a time interval has a small variation from an amount of time to fulfill the number of orders received during the time interval. This prevents conventional online concierge systems from accounting for shoppers having capacity to fulfill more orders during a time interval than the number of orders received during the time interval, resulting in underestimation of an available number of shoppers during a time interval.

SUMMARY

To fulfill an order, the online concierge system displays the order to one or more shoppers and receives a selection of the order by a shopper. The shopper subsequently obtains items included in the order from a warehouse specified by the order and delivers the obtained items to a location specified by the order. As an amount of time for a shopper to select an order for fulfillment affects whether the order will be fulfilled by a fulfillment time specified in the order, the online concierge system trains a selection prediction model to determine a predicted amount of time between identification of an order to shoppers and a shopper selecting the order for fulfillment. In various embodiments, the selection prediction model is trained to determine a predicted amount of time between identification of orders to shoppers and selection of the orders from a shopper-order ratio value based on a number of shoppers available to fulfill orders and a number of orders to be fulfilled (e.g., a ratio of a number of shoppers to a number of orders to be fulfilled).

To train the selection prediction model, the online concierge system obtains training data comprising multiple examples from prior order fulfillment during various time intervals, such as earlier time intervals prior to a time when the selection prediction model is trained. Each example includes a shopper-order ratio value based on a number of orders to be fulfilled during an earlier time interval and a number of shoppers available to fulfill orders during the earlier time interval. A label is applied to each example specifying a time between identification of an order to shoppers during the earlier time interval and selection of the order for fulfillment during the earlier time interval. A selection prediction model is applied to multiple examples of the training data, with the selection prediction model receiving as input a shopper-order ratio value based on a number of orders to be fulfilled and a number of shoppers available to fulfill orders and outputting a predicted amount of time for a shopper to select an order for fulfillment from the input value. The selection prediction model is trained by application to various examples of the training data. After training, the selection prediction model is stored by the online concierge system. In various embodiments, the selection prediction model is associated with a particular geographic region, and the online concierge system trains and maintains a selection prediction model for different geographic regions.

An amount of time between orders being presented to shoppers and a shopper selecting an order for fulfillment provides an indication of a capability of a number of shoppers to fulfill orders, with longer amounts of time indicating that the number of shoppers has difficulty fulfilling the number of orders within times specified by the orders. The online concierge system may leverage the predicted amount of time for a shopper to select an order for fulfillment to evaluate whether a number of shoppers allocated to fulfill orders within a time interval is sufficient to fulfill orders received during the time interval. With the trained selection prediction model stored, the online concierge system identifies a time interval.

For the identified time interval, the online concierge system generates a predicted number of orders to be fulfilled during the identified time interval. In various embodiments, the online concierge system generates the predicted number of orders to be fulfilled during the identified time interval from numbers of orders that were fulfilled during the earlier time intervals. In various embodiments, the online concierge system applies a time series model to numbers of orders fulfilled during various earlier time intervals to generate the predicted number of orders to be fulfilled during the identified time interval.

Additionally, from interactions by shoppers with a shopper mobile application, from which shoppers select orders for fulfillment, during earlier time intervals, the online concierge system generates a predicted number of shoppers available to fulfill orders during the identified time interval. In various embodiments, the predicted number of shoppers are determined from a number of unique shoppers who performed a specific interaction with the shopper mobile application during different earlier time intervals. The specific interaction with the shopper mobile application may be accessing the shopper mobile application, providing an indication to the online concierge system that a shopper is available to fulfill orders during an earlier time interval via the shopper mobile application, or other interactions with the shopper mobile application indicating capability to fulfill orders. The online concierge system may apply a classical time series model to the numbers of unique users who performed the specific interaction with the shopper mobile application during earlier time intervals to generate the predicted number of shoppers available to fulfill orders during the identified time interval in various embodiments. By using interactions with the shopper mobile applications to identify numbers of users for the earlier time intervals, the online concierge system more accurately generates the predicted number of shoppers available to fulfill orders during the identified time interval. Conventional methods that use amounts of time shoppers worked fulfilling orders in time intervals are constrained by a number of orders to be fulfilled during different time intervals, as the number of orders to be fulfilled during a time interval places a limit on the amount of time worked by shoppers; such a limitation may result in the online concierge system under-counting the number of shoppers available by failing to account for shoppers who were available to fulfill orders but who were unable to do so because of limited orders to be fulfilled.

Additionally, the online concierge system specifies a target amount of time between identification of orders to shoppers and selection of the orders. In some embodiments, the target amount of time between identification of orders to shoppers and selection of the orders is specified for a particular time interval, allowing different target amounts of time between identification of orders to shoppers and selection of the orders to be specified for different time intervals. Alternatively, the online concierge system specifies a target amount of time between identification of orders to shoppers and selection of the orders for multiple time intervals. As the amount of time between identification of orders to shoppers and selection of the orders provides an indication of whether a predicted number of shoppers allocated to the identified time interval, the target amount of time between identification of orders to shoppers and selection of the orders allows the online concierge system to maintain a metric for evaluating whether a number of shoppers allocated for fulfilling orders is sufficient for fulfilling a number of orders during a time interval.

From the predicted number of orders to be fulfilled during the identified time interval and the predicted number of shoppers available to fulfill orders during the identified time interval, the online concierge system generates a shopper-order ratio value for the identified time interval. For example, the shopper-order ratio value for the identified time interval is a ratio of the predicted number of shoppers to the predicted number of orders. The shopper-order ratio value for the identified time interval is input to the selection prediction model, which generates a predicted amount of time for shoppers to select orders during the identified time interval. Hence, the selection prediction model allows the online concierge system to determine a predicted amount of time for shoppers to select orders for fulfillment based on the predicted number of orders to be fulfilled during the identified time interval and the predicted number of shoppers available to fulfill orders during the identified time interval.

The online concierge system compares the predicted amount of time to a target amount of time to select orders for fulfillment. Based on the comparison, the online concierge system determines whether the predicted number of shoppers to fulfill orders during the identified time interval causes a supply gap. In various embodiments, the online concierge system modifies a number of shoppers allocated for fulfilling orders during the identified time interval in response to the comparison indicating the predicted number of shoppers causes a supply gap. For example, in response to the comparison indicating the predicted amount of time exceeds the target amount of time, the online concierge system determines a supply gap is present during the identified time interval. The supply gap indicates that the predicted number of shoppers is unable to fulfill orders during the identified time interval by times specified by the orders. To offset a supply gap for the identified time interval, the online concierge system increases a number of shoppers allocated to fulfilling orders during the identified time interval. In one embodiment, the online concierge system recommends a number of additional shoppers to increase the predicted supply of shoppers for the time interval. Other systems within the online concierge system may then determine how to achieve that recommended increase (e.g., by sending promotional offers to existing shoppers, hiring more shoppers, etc.).

In some embodiments, to compare the predicted amount of time between identification of orders to shoppers and selection of the orders to the target amount of time between identification of orders to shoppers and selection of the orders, the online concierge system determines a target shopper-order ratio value corresponding to the target amount of time. In one embodiment, the target shopper-order ratio value is determined based on historical time intervals with lost demand estimates below a threshold, taking the median time between identification of orders to shoppers and selection of the orders from those days. From the target shopper-order ratio value and the predicted number of orders to be fulfilled during the identified time interval, the online concierge system determines a target number of shoppers to fulfill orders during the identified time interval. For example, the target shopper-order ratio value is a ratio of a number of shoppers to a number of orders, so the online concierge system determines the target number of shoppers to fulfill orders during the identified time interval as a product of the target shopper-order ratio value and the predicted number of orders to fulfill during the identified time interval. However, in other embodiments, the online concierge system uses different relationships between the target shopper-order ratio value and the predicted number of orders during the identified time interval to generate the target number of shoppers to fulfill orders during the identified time interval.

The online concierge system compares the predicted number of shoppers available to fulfill orders during the identified time interval to the target number of shoppers. In response to the predicted number of shoppers available to fulfill orders during the identified time interval being less than the target number of shoppers, the online concierge system determines there is a supply gap for the identified time interval where the predicted number of shoppers allocated for fulfilling orders during the identified time interval is unable to fulfill the predicted number of orders during the identified time interval within the target time between identification of orders to shoppers and selection of the orders. The online concierge system increases a number of shoppers allocated to fulfilling orders during the identified time interval to mitigate the supply gap in various embodiments.

In various embodiments, the online concierge system selects and applies one or more methods for adjusting allocation of shoppers to a time interval (e.g., adjusting allocation of shoppers to a geographic region during a time interval) to increase a predicted number of shoppers for fulfilling orders during the time interval. An example method for adjusting allocation of shoppers to a geographic region for fulfilling orders during the identified time interval is soliciting or requesting new shoppers to join the online concierge system for fulfilling orders in the identified geographic region during the identified time interval. Another example method for adjusting allocation of shoppers to the geographic region during the identified time interval allocates shoppers who are not assigned to a geographic region during the identified time interval to fulfill orders with locations in the identified geographic region during the identified time interval. As another example method for adjusting allocation of shoppers to the geographic region during the identified time interval provides one or more incentives (e.g., additional compensation) to shoppers to fulfill an increased number of orders with locations within the identified geographic region or for shoppers allocated to other geographic regions to also fulfill orders with locations within the identified geographic region during the identified time interval. The online concierge system may apply a combination of methods for increasing a number of predicted shoppers allocated for fulfilling orders during the identified time interval in various embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
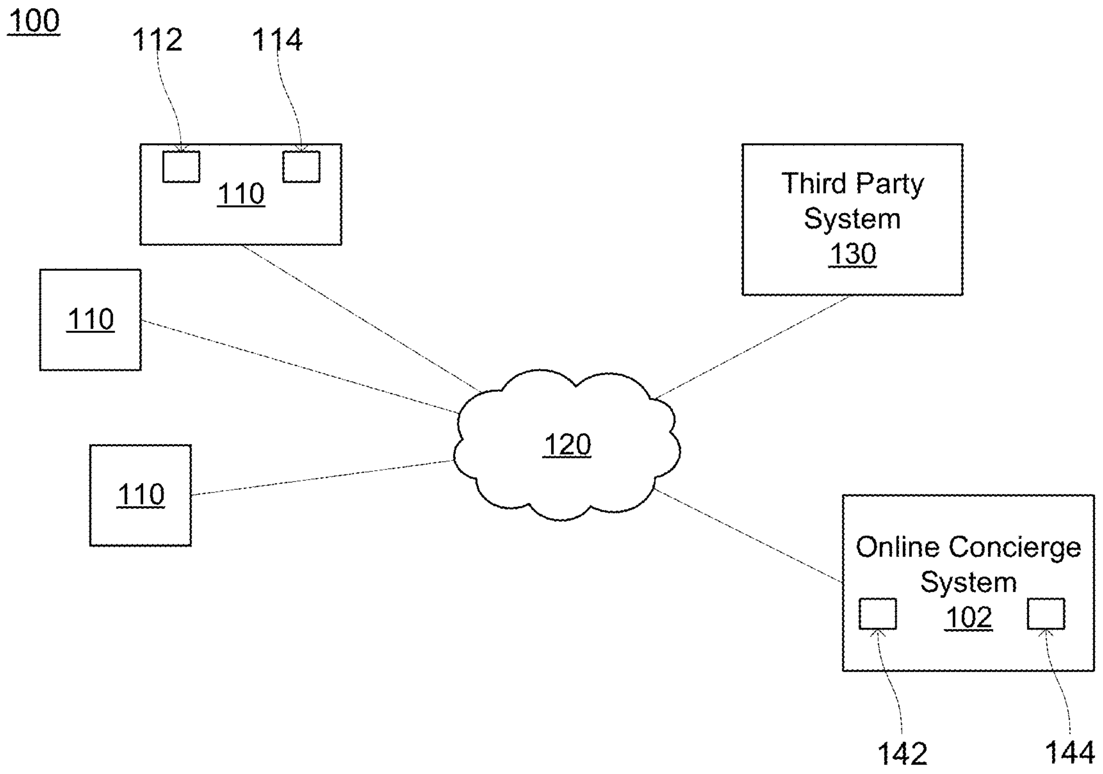
FIG. 1 is a block diagram of a system environment in which an online system, such an online concierge system, operates, according to one embodiment.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 710 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 710 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described below in conjunction with FIGS. 2, 5 and 6. For example, the memory 144 has instructions encoded thereon that, when executed by the processor 142, cause the processor 142 to determine a predicted number of orders to be fulfilled during a time interval and determine a predicted number of shoppers to fulfill orders during the time interval. The processor further trains a selection prediction model that generates a predicted amount of time for a shopper to accept an order during the time interval from a shopper-order ratio value based on the predicted number of orders to be fulfilled and the predicted number of shoppers to fulfill orders, as further described below in conjunction with FIGS. 5 and 6. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-6, and may include specific computing components such as processors, memories, communication interfaces, and/or the like.

System Overview

Figure 2:
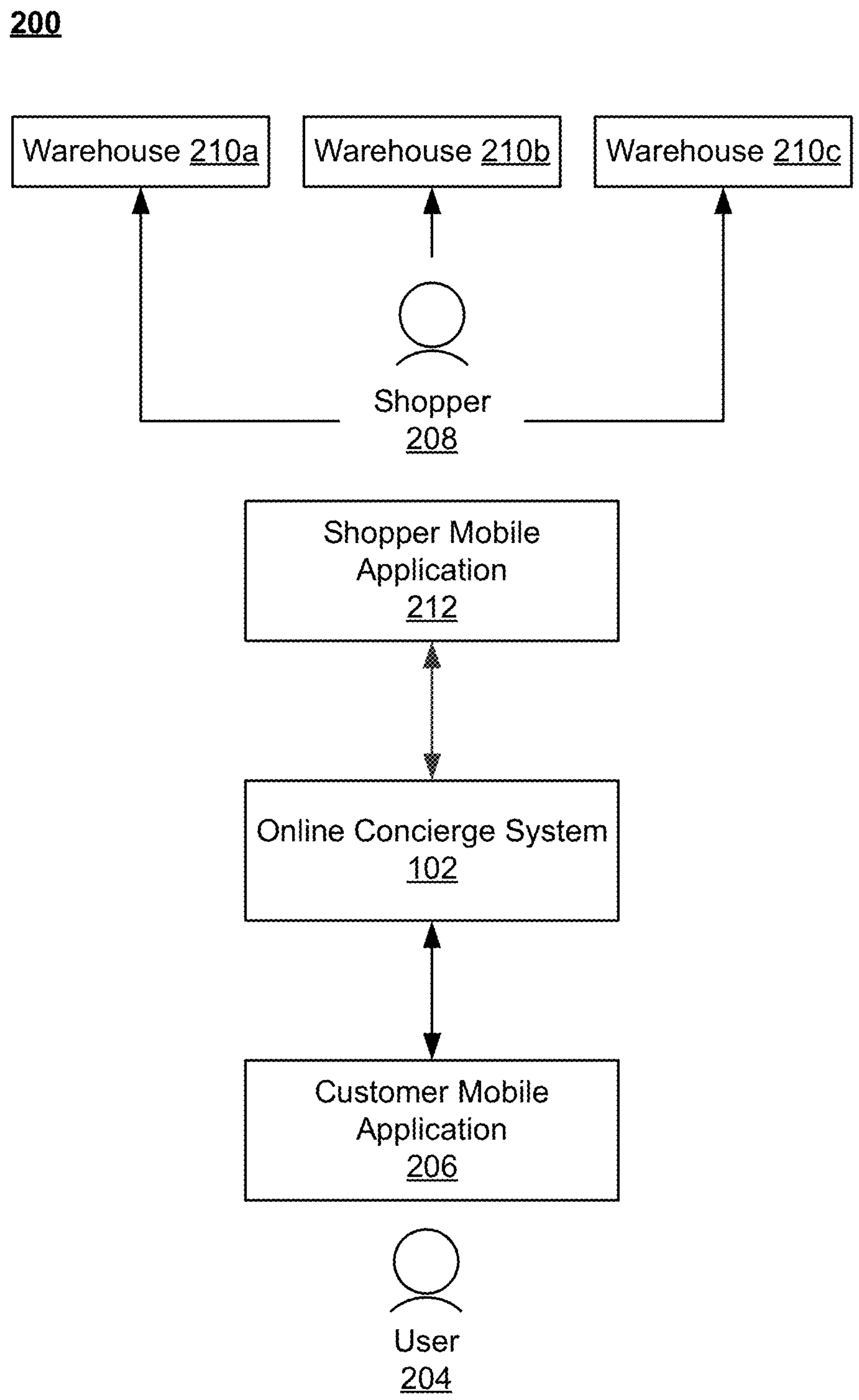
FIG. 2 illustrates an environment of an online shopping concierge service, according to one embodiment.

FIG. 2 illustrates an environment 200 of an online platform, such as an online concierge system 102, according to one embodiment. The figures use like reference numerals to identify like elements. A letter after a reference numeral, such as "210*a*," indicates that the text refers specifically to the element having that particular reference numeral. A reference numeral in the text without a following letter, such as "210," refers to any or all of the elements in the figures bearing that reference numeral. For example, "210" in the text refers to reference numerals "210*a*" or "210*b*" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 202. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210*a*, 210*b*, and 210*c* (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
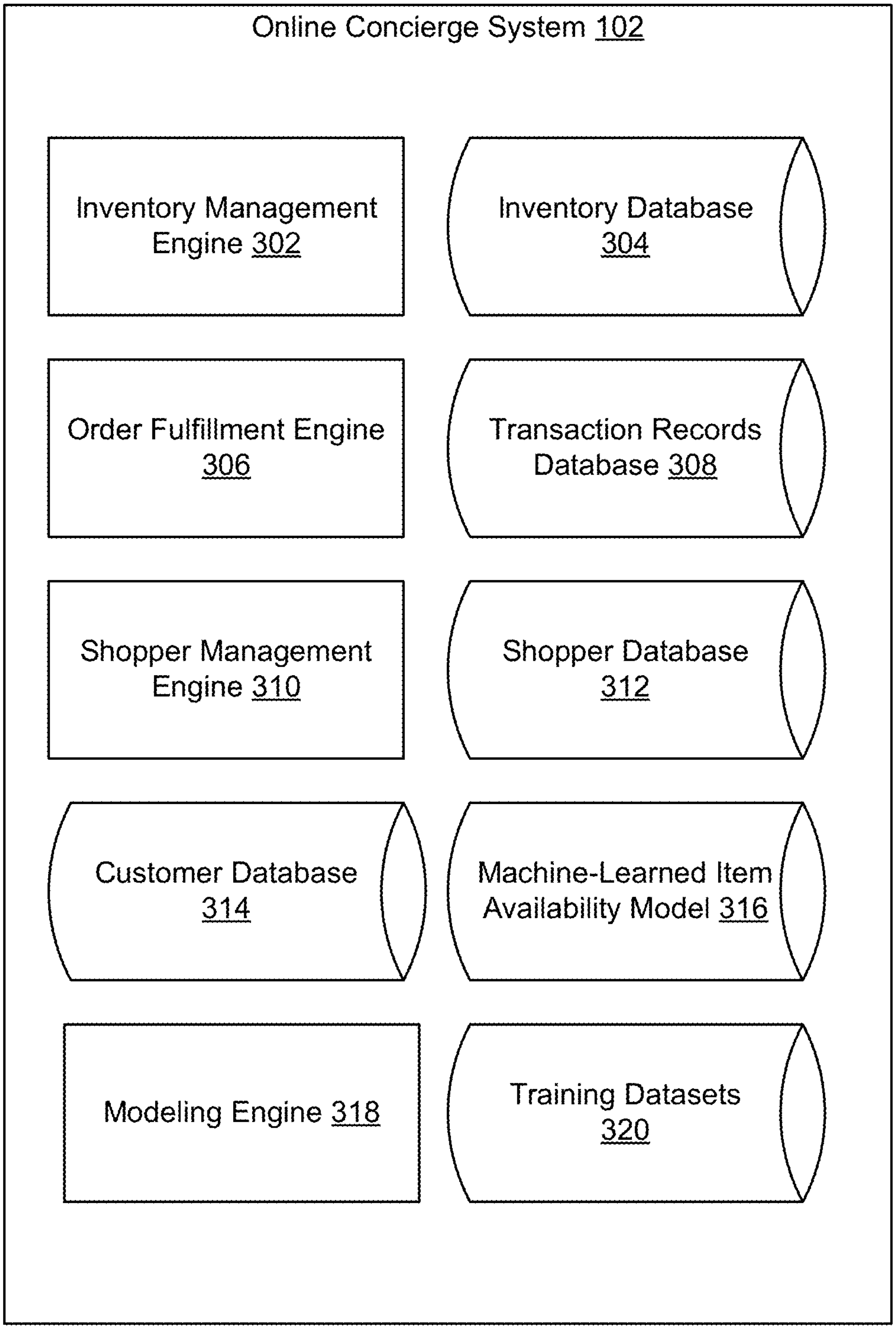
FIG. 3 is a diagram of an online shopping concierge system, according to one embodiment.

FIG. 3 is a diagram of an online concierge system 102, according to one embodiment. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 202 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine e 10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfilment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine Learning Models

The online concierge system 102 further includes a machine-learned item availability model 316, a modeling engine 318, and training datasets 320. The modeling engine 318 uses the training datasets 320 to generate the machine-learned item availability model 316. The machine-learned item availability model 316 can learn from the training datasets 320, rather than follow only explicitly programmed instructions. The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

In various embodiments, the modeling engine 318 includes one or more models that predict a number of orders to be fulfilled during a time interval, and one or more models that predict a number of shoppers available to fulfill orders during the time interval. In various embodiments, the models are classical time series models that generate the predicted number of orders during a time interval based on numbers of orders fulfilled in earlier time intervals and that generate the predicted number of shoppers from numbers of shoppers available to fulfill orders during earlier time intervals. As further described below in conjunction with FIGS. 5 and 6, to generate the predicted number of shoppers, the modeling engine 318 determines numbers of unique users who performed one or more specific interactions with the customer mobile application 212 during earlier time intervals (e.g., shoppers who accessed the online concierge system 102 from the customer mobile application during the earlier time intervals).

Additionally, the modeling engine 318 trains and stores a selection prediction model that receives a value based on a number of orders to be fulfilled and a number of shoppers to fulfill the orders and outputs a predicted amount of time for shoppers to accept one or more orders. Training of the selection prediction model is further described below in conjunction with FIGS. 5 and 6. For an identified time interval, the modeling engine 318 applies the selection prediction model to a value generated from the predicted number of orders during the identified time interval and from the predicted number of shoppers to fulfill orders during the identified time interval to generate a predicted amount of time to select orders. By comparing the predicted amount of time to select orders to a target amount of time to select orders, the modeling engine 318 determines whether the predicted number of shoppers is sufficient to fulfill the predicted number of orders during the identified time interval. In response to the predicted amount of time to select orders exceeding the target amount of time to select orders, the modeling engine 318 executes one or more models to increase a number of shoppers allocated to the identified time interval, as further described below in conjunction with FIGS. 5 and 6.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
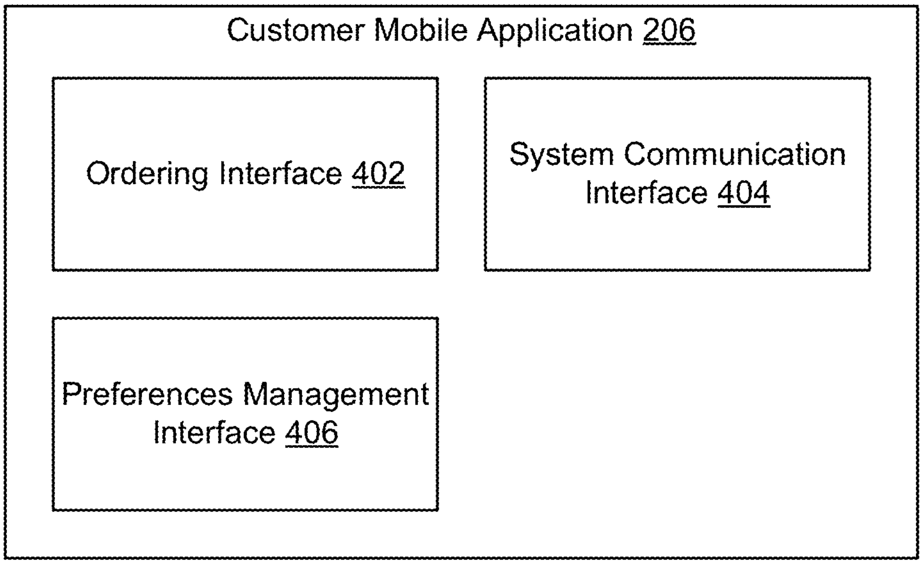
FIG. 4A is a diagram of a customer mobile application (CMA), according to one embodiment.

FIG. 4A is a diagram of the customer mobile application (CMA) 206, according to one embodiment. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 202. The CMA 206 also includes a preferences management interface 406 which allows the user 104 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
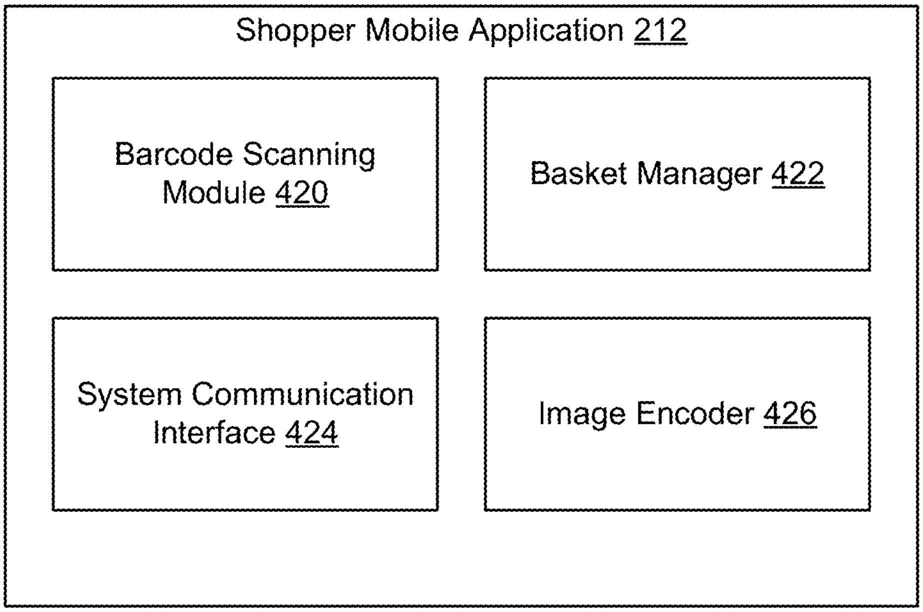
FIG. 4B is a diagram of a shopper mobile application (SMA), according to one embodiment.

FIG. 4B is a diagram of the shopper mobile application (SMA) 212, according to one embodiment. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Figure 5:
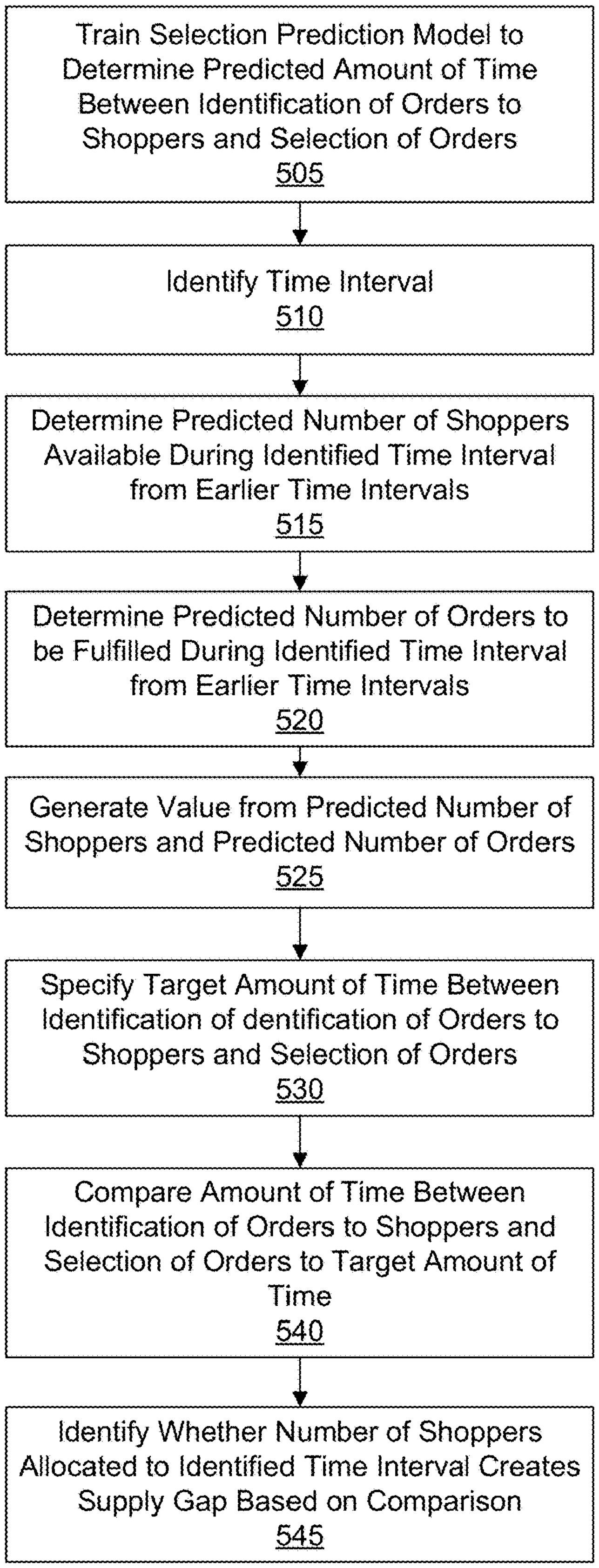
FIG. 5 is a flowchart of a method for allocating shoppers for fulfilling orders during a time interval based on a predicted number of shoppers available during the time interval and a time for shoppers to accept orders, according to one embodiment.

Allocating Shoppers for Order Fulfillment Based on Time for Shoppers to Accept Orders for Fulfillment FIG. 5 is a flowchart of one embodiment of a method for allocating shoppers for fulfilling orders during a time interval based on a predicted number of shoppers available during the time interval and a time for shoppers to accept orders. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments, while in other embodiments, the steps of the method are performed by any online system capable of retrieving items.

To fulfill orders received from users, an online concierge system 102 assigns or allocates shoppers to a geographic area during a time interval. Orders including fulfillment times within the time interval are displayed to shoppers via a shopper mobile application (SMA) 212 executing on a client device 110 of a shopper, allowing the shopper to select one or more orders for fulfillment during the time interval. As different time intervals often include different numbers of orders for fulfillment, the online concierge system 102 adjusts numbers of shoppers allocated to different time intervals based on a predicted number of orders identifying a time interval for fulfillment.

To fulfill an order, the online concierge system 102 displays the order to one or more shoppers and receives a selection of the order by a shopper. The shopper subsequently obtains items included in the order from a warehouse 210 specified by the order and delivers the obtained items to a location specified by the order. As an amount of time for a shopper to select an order for fulfillment affects whether the order will be fulfilled by a fulfillment time specified in the order, the online concierge system 102 trains 505 a selection prediction model to determine a predicted amount of time between identification of an order to shoppers and a shopper selecting the order for fulfillment. In various embodiments, the selection prediction model is trained 505 to determine a predicted amount of time between identification of orders to shoppers and selection of the orders from a shopper-order ratio value based on a number of shoppers available to fulfill orders and a number of orders to be fulfilled (e.g., a ratio of a number of shoppers to a number of orders to be fulfilled).

In various embodiments, the online concierge system 102 trains 505 different selection prediction models for different geographic regions, with a geographic region including one or more locations identified by orders. Maintaining selection prediction models for different geographic regions allows the online concierge system 102 to account for differences in characteristics of different geographic locations. For example, different selection prediction models for different geographic regions allow different selection prediction models to account for differences in pricing in different geographic regions. As another example, different geographic regions receive different numbers of orders and have different numbers of shoppers available to fulfil orders, so training 505 different selection models for different geographic regions results in selection prediction models better tailored to account for particular characteristics of a corresponding geographic region affecting selection of orders for fulfillment. In various embodiments, the online concierge system 102 trains 505 each selection prediction model at a periodic interval. For example, the online concierge system 102 trains 505 selection prediction models daily, or at any other suitable interval.

To train 505 a selection prediction model, the online concierge system 102 generates training data comprising a plurality of examples from previously fulfilled orders during earlier time intervals. For example, a time interval is a time of day (e.g., 12:00 PM to 2:00 PM), and the online concierge system 102 generates examples for the training data from previously fulfilled orders during the time of day on earlier days, so the examples provide information about order fulfillment during the time of day during earlier days. As another example, the examples are based on previously fulfilled orders during a particular time of day during a particular day of the week (e.g., orders previously fulfilled during 12:00 PM to 2:00 PM on Wednesdays). However, different criteria may be used by the online concierge system 102 to generate the examples for the training data.

In various embodiments, each example of the training data includes information describing a number of shoppers available to fulfill orders and a number of orders to be fulfilled, with a label applied to each example identifying an amount of time between identification of an order to shoppers and selection of the order. In some embodiments, the information describing the number of shoppers available to fulfill orders and the number of orders to be fulfilled is a ratio of a number of shoppers available to fulfill orders to a number of orders to be fulfilled. In other embodiments, the information describing the number of shoppers available to fulfill orders and the number of orders to be fulfilled is a ratio of a number of orders to be fulfilled to a number of shoppers available to fulfill orders. Other values determined from the number of shoppers available to fulfill orders and the number of orders to be fulfilled may be used in other embodiments. Determining the shopper-order ratio value from the number of shoppers available to fulfill orders and the number of orders to be fulfilled allows the online concierge system 102 to account for a relative supply and demand for different amounts of time between identifying orders to shoppers and selection of orders by shoppers in when shoppers selected groups for fulfillment. The examples of the training data my include additional information describing conditions when shoppers selected orders for fulfillment.

The online concierge system 102 applies the selection prediction model to each of the plurality of examples of the training data. For an example of the training data, application of the selection prediction model to the user generates a predicted amount of time for a shopper to select an order for fulfillment. The online concierge system 102 determines an error term from a difference between the label applied to the example of the training data and the predicted amount of time for a shopper to select the order for fulfillment. The error term may be generated through any suitable loss function, or combination of loss functions, in various embodiments. For example, the loss function is a mean squared error between a predicted amount of time for a shopper to select an order for fulfillment from an example of the training data and a label applied to the corresponding example of the training data. However, in other embodiments, any loss function or combination of loss functions, may be applied to the predicted amount of time for a shopper to select an order for fulfillment and the label applied to the corresponding example of the training data to generate the error term.

The online concierge system 102 backpropagates the one or more error terms from the label applied to an example of the training data and the predicted amount of time for a shopper to select an order for fulfillment through layers of a network comprising the selection prediction mode after initializing the layers. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until one or more criteria are satisfied. For example, the backpropagation of the one or more error terms is repeated until the one or more loss functions satisfy one or more criteria. As another example, the online concierge system 102 backpropagates the one or more error terms for a specific number of iterations. Hence, the one or more criteria specify conditions for when the backpropagation of the one or more error terms through the layers of the network is stopped. In some embodiments, the online concierge system 102 uses gradient descent or another process to minimize the one or more error terms.

In response to the one or more loss functions satisfying the one or more criteria and the online concierge system 102 stopping the backpropagation of the one or more error terms, the online concierge system 102 stores the set of parameters for the layers of the selection prediction network. For example, the online concierge system 102 stores the weights of connections between nodes in the network as the set of parameters of the network in a non-transitory computer readable storage medium. Hence, training of the selection prediction model allows the online concierge system 102 to generate and to store a neural network, or other machine learning model, that generates a predicted amount of time for a shopper to select the group of orders for fulfillment based on a shopper-order ratio value determined from a number of shoppers available to fulfill orders and a number of orders to be fulfilled. The selection prediction model may be different machine learning models, such as a neural network, boosted tree, gradient boosted tree or random forest model in various embodiments. In some examples, the selection prediction model is trained via a XGBoost process when the selection prediction model is applied to examples of the training data. The online concierge system 102 retrains the selection prediction model at various intervals, such as at a periodic interval, in various embodiments, allowing the selection prediction model to account for changes in available shoppers or in orders to be fulfilled over time, as well as to account for varying conditions in a geographic region or in different time intervals. An example of a selection prediction model is further described in U.S. patent application Ser. No. 17/493,780, filed on Oct. 4, 2021, which is hereby incorporated by reference in its entirety.

To identify time intervals with a gap between a predicted number of shoppers to fulfill orders and a predicted number of orders to be fulfilled, the online concierge system 102 identifies 510 a time interval. The online concierge system 102 determines 515 a predicted number of shoppers available during the identified time interval by applying one or more trained shopper supply models to information describing accesses to a shopper mobile application 212. In various embodiments, a trained shopper supply model determines a predicted number of shoppers available during a time interval from information describing a number of distinct shoppers who accessed the shopper mobile application 212 during one or more earlier time intervals. For example, the online concierge system 102 determines a number of unique shoppers who accessed the shopper mobile application 212 during one or more earlier time intervals based on user identifiers received from the shopper mobile application 212 with requests for information from the online concierge system 102 (e.g., requests to view available orders). As another example, the online concierge system 102 determines a number of unique users from whom an indication that the shopper was available to fulfill orders during one or more earlier time intervals. The indication that a shopper is available to fulfill orders may be received by the online concierge system 102 from a shopper mobile application 212 and stored in association with a user identifier for the user and the time interval during which the user is available to fulfill orders. In other embodiments, the online concierge system 102 determines a number of unique shoppers who performed a specific interaction with the shopper mobile application 212 during one or more earlier time intervals.

In various embodiments, a trained shopper supply model is a classical time series model that receives as input a number of unique shoppers available to fulfill orders during different earlier time intervals and determines 505 the predicted number of shoppers available to fulfill orders during the identified time interval from the numbers of unique shoppers available to fulfill orders during different earlier time intervals. Leveraging interactions by shoppers with the online concierge system 102 during earlier time intervals or information received by the online concierge system 102 identifying numbers of shoppers available during the earlier time intervals allows the online concierge system 102 to obtain more accurate information about numbers of shoppers available during different time intervals. This allows the predicted number of shoppers available to fulfill orders to more accurately reflect a likely number of shoppers available compared to conventional techniques that are based on numbers of hours worked by shoppers in different time intervals. As conventional techniques using hours worked by shoppers are capped by the number of orders to be fulfilled in a time interval, these conventional techniques may under-represent a number of shoppers available for order fulfillment during a time interval. By using interactions by shoppers with the online concierge system 102 during earlier time intervals or information received by the online concierge system 102 identifying numbers of shoppers available, the online concierge system 102 determines 515 the predicted number of shoppers using a more accurate measure of shopper availability that is not limited by a number of orders to be fulfilled during a time interval.

Additionally, the online concierge system 102 determines 520 a predicted number of orders to be fulfilled during the identified time interval based on numbers or orders fulfilled during the earlier time intervals. For example, the online concierge system 102 identifies a set of earlier time intervals and retrieves a number of orders fulfilled during each earlier time interval of the set. In various embodiments, the online concierge system 102 determines 520 the predicted number of orders to be fulfilled during the identified time interval using a classical time series model that is applied to a number of orders fulfilled during different earlier time intervals.

In various embodiments, the online concierge system 102 determines 520 the predicted number of orders to fulfill during the identified time interval using a classical time series model using exponential smoothing. For example, the online concierge system 102 applies a Holt-Winters classical time series model to predicted numbers of orders for different earlier time intervals. In some embodiments, the online concierge system 102 filters the earlier time intervals by removing earlier time intervals satisfying one or more criteria. The online concierge system 102 determines 520 the predicted number of orders to fulfill during the identified time interval based on numbers of orders to be fulfilled during the filtered earlier time intervals. For example, the online concierge system 102 removes earlier time intervals having a number of orders exceeding an average number of orders across earlier time intervals by at least a threshold amount, allowing the online concierge system 102 to prevent spikes in order volume unlikely to be repeated from skewing determination of the predicted number of orders.

The online concierge system 102 generates 525 a shopper-order ratio value for the identified time interval based on the predicted number of orders to be fulfilled during the identified time interval and the predicted number of shoppers available to fulfill orders during the identified time interval. For example, the shopper-order ratio value is a ratio of the predicted number of orders to be fulfilled during the identified time interval to the predicted number of shoppers available to fulfill orders during the identified time interval. In other embodiments, the shopper-order ratio value is a ratio of the predicted number of shoppers available to fulfill orders during the identified time interval to the predicted number of orders to be fulfilled during the identified time interval. Other values may be determined from the predicted number of orders to be fulfilled during the identified time interval and the predicted number of shoppers available to fulfill orders during the identified time interval in other embodiments.

Additionally, the online concierge system 102 specifies 530 a target amount of time between identification of orders to shoppers and selection of the orders. In some embodiments, the target amount of time between identification of orders to shoppers and selection of the orders is specified 530 for a particular time interval, allowing different target amounts of time between identification of orders to shoppers and selection of the orders to be specified 530 for different time intervals. Alternatively, the online concierge system 102 specifies 530 a target amount of time between identification of orders to shoppers and selection of the orders for multiple time intervals. As the amount of time between identification of orders to shoppers and selection of the orders provides an indication of whether a predicted number of shoppers allocated to the identified time interval, the target amount of time between identification of orders to shoppers and selection of the orders allows the online concierge system 102 to maintain a metric for evaluating whether a number of shoppers allocated for fulfilling orders is sufficient for fulfilling a number of orders during a time interval.

The online concierge system 102 applies the trained selection prediction model to the shopper-order ratio value generated 525 the identified time interval based on the predicted number of orders to be fulfilled during the identified time interval and the predicted number of shoppers available to fulfill orders during the identified time interval. Application of the trained selection prediction model generates 535 a predicted amount of time between identification of orders to shoppers and selection of the orders for the identified time interval. The online concierge system 102 compares 540 the predicted amount of time between identification of orders to shoppers and selection of the orders to the target amount of time between identification of orders to shoppers and selection of the orders. Based on the comparison between the predicted amount of time between identification of orders to shoppers and selection of the orders to the target amount of time between identification of orders to shoppers and selection of the orders, the online concierge system 102 identifies whether the predicted number of shoppers allocated to the identified time interval creates a supply gap where the predicted number of shoppers allocated to the identified time interval is insufficient for fulfilling the predicted number of orders for the identified time interval.

In response to the predicted amount of time between identification of orders to shoppers and selection of the orders exceeds the target amount of time between identification of orders to shoppers and selection of the orders, the online concierge system 102 determines there is a supply gap for the identified time interval where the predicted number of shoppers allocated for fulfilling orders during the identified time interval is unable to fulfill the predicted number of orders during the identified time interval. To offset a supply gap for the identified time interval, the online concierge system 102 increases a number of shoppers allocated to fulfilling orders during the identified time interval. In various embodiments, the online concierge system 102 selects and applies one or more methods for adjusting allocation of shoppers to a time interval (e.g., adjusting allocation of shoppers to a geographic region during a time interval) to increase a predicted number of shoppers for fulfilling orders during the time interval. An example method for adjusting allocation of shoppers to a geographic region for fulfilling orders during the identified time interval is soliciting or requesting new shoppers to join the online concierge system 102 for fulfilling orders in the identified geographic region during the identified time interval. Another example method for adjusting allocation of shoppers to the geographic region during the identified time interval allocates shoppers who are not assigned to a geographic region during the identified time interval to fulfill orders with locations in the identified geographic region during the identified time interval. As another example method for adjusting allocation of shoppers to the geographic region during the identified time interval provides one or more incentives (e.g., additional compensation) to shoppers to fulfill an increased number of orders with locations within the identified geographic region or for shoppers allocated to other geographic regions to also fulfill orders with locations within the identified geographic region during the identified time interval. The online concierge system 102 may apply a combination of methods for increasing a number of predicted shoppers allocated for fulfilling orders during the identified time interval in various embodiments. Selection of one or more models to increase a number of shoppers allocated for fulfilling orders is further described in U.S. patent application Ser. No. 17/556,936, filed on Dec. 20, 2021, which is hereby incorporated by reference herein in its entirety.

In some embodiments, to compare 540 the predicted amount of time between identification of orders to shoppers and selection of the orders to the target amount of time between identification of orders to shoppers and selection of the orders, the online concierge system 102 determines a target shopper-order ratio value corresponding to the target amount of time, with the target shopper-order ratio value determined from a number of orders to be fulfilled and a number of shoppers available to fulfill orders. From the target shopper-order ratio value and the predicted number of orders to be fulfilled during the identified time interval, the online concierge system 102 determines a target number of shoppers to fulfill orders during the identified time interval. For example, the target shopper-order ratio value is a ratio of a number of shoppers to a number of orders, so the online concierge system 102 determines the target number of shoppers to fulfill orders during the identified time interval as a product of the target shopper-order ratio value and the predicted number of orders to fulfill during the identified time interval. However, in other embodiments, the online concierge system 102 uses different relationships between the target shopper-order ratio value and the predicted number of orders during the identified time interval to generate the target number of shoppers to fulfill orders during the identified time interval.

The online concierge system 102 compares the predicted number of shoppers available to fulfill orders during the identified time interval to the target number of shoppers. In response to the predicted number of shoppers available to fulfill orders during the identified time interval being less than the target number of shoppers, the online concierge system 102 determines there is a supply gap for the identified time interval where the predicted number of shoppers allocated for fulfilling orders during the identified time interval is unable to fulfill the predicted number of orders during the identified time interval. To offset a supply gap for the identified time interval, the online concierge system 102 increases a number of shoppers allocated to fulfilling orders during the identified time interval, as further described above.

In various embodiments, the online concierge system 102 determines a number of additional shoppers to allocate to the identified time interval from a difference between the predicted number of shoppers available to fulfill orders during the identified time interval and a number of shoppers corresponding to the target amount of time between identification of orders to shoppers and selection of the orders. For example, the online concierge system 102 determines a target number of shoppers available to fulfill orders during the identified time interval from the target amount of time between identification of orders to shoppers and selection of the orders and the predicted number of orders to be fulfilled during the identified time interval. In an example, the online concierge system 102 determines a target shopper-order ratio value based on the predicted number of orders to be fulfilled during the identified time interval and the predicted number of shoppers available to fulfill orders during the identified time interval corresponding to the target amount of time between identification of orders to shoppers and selection of the orders. The online concierge system determines the target number of shoppers available to fulfill orders during the identified time interval as a number of shoppers for which the target shopper-order ratio value is generated with the predicted number of orders to be fulfilled during the identified time interval. The online concierge system 102 applies one or more methods for increasing a number of shoppers allocated for fulfilling orders to increase a number of shoppers by at least an amount corresponding to a difference between the target number of shoppers and the predicted number of shoppers available to fulfil orders during the identified time interval.

In some embodiments, the online concierge system 102 reduces a number of shoppers available to fulfill orders during the identified time interval in response to the predicted amount of time between identification of orders to shoppers and selection of the orders being less than the target amount of time between identification of orders to shoppers and selection of the orders. For example, the online concierge system 102 reduces the number of shoppers available to fulfill orders during the identified time interval in response to the predicted amount of time between identification of orders to shoppers and selection of the orders being at least a threshold amount less than the target amount of time between identification of orders to shoppers and selection of the orders.

Figure 6:
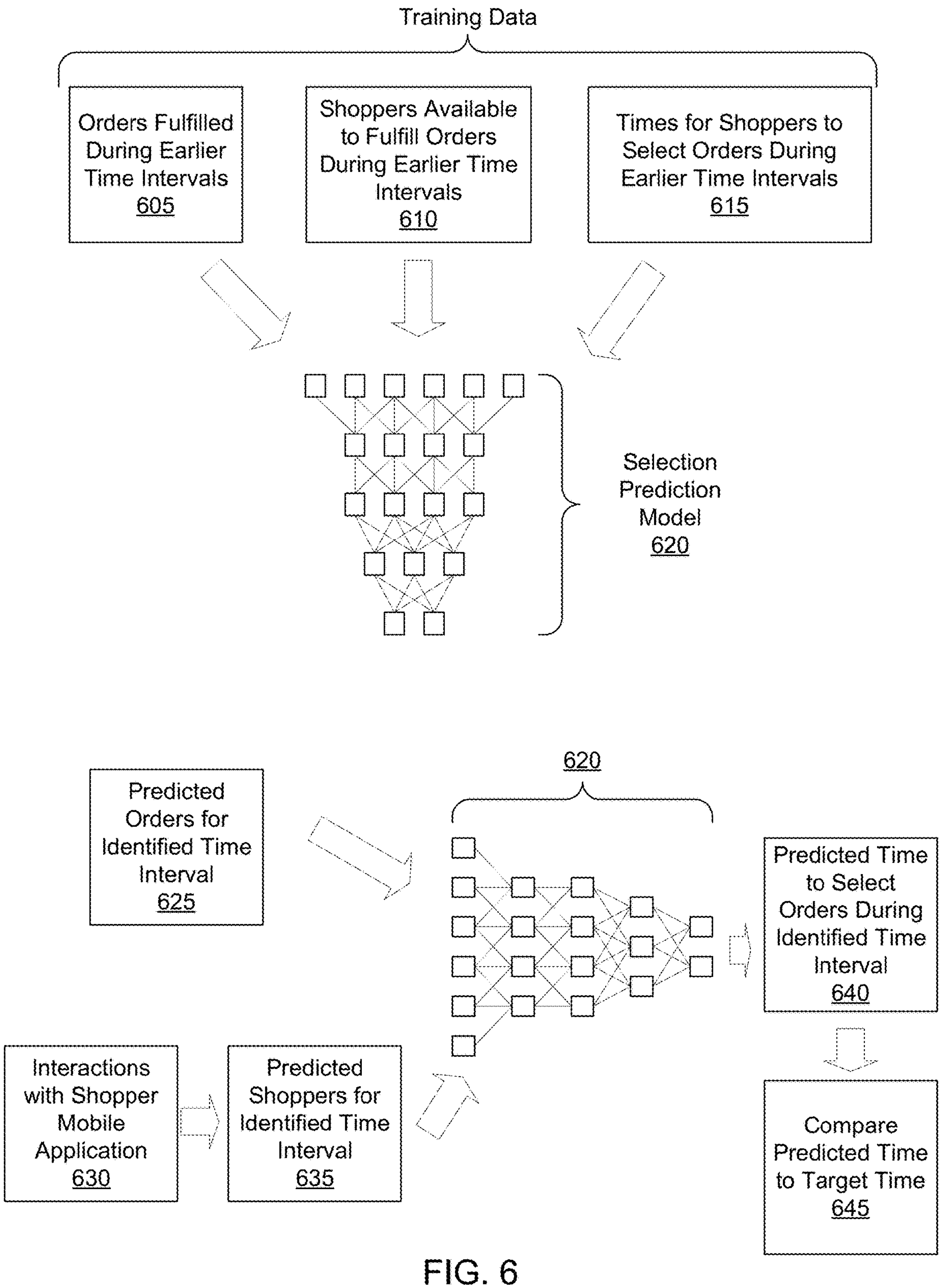
FIG. 6 is a process flow diagram of a method for allocating shoppers for fulfilling orders during a time interval based on a predicted number of shoppers available during the time interval and a time for shoppers to accept orders, according to one embodiment.

FIG. 6 is a process flow diagram of one embodiment of a method for allocating shoppers for fulfilling orders during a time interval based on a predicted number of shoppers available during the time interval and a time for shoppers to accept orders. As further described above in conjunction with FIG. 5, an online concierge system 102 obtains training data comprising multiple examples. Each example includes a shopper-order ratio value based on a number of orders 605 to be fulfilled during an earlier time interval and a number of shoppers 610 available to fulfill orders during the earlier time interval. A label is applied to each example specifying a time 615 between identification of an order to shoppers during the earlier time interval and selection of the order for fulfillment during the earlier time interval. A selection prediction model 620 is applied to multiple examples of the training data, with the selection prediction model 620 receiving as input a shopper-order ratio value based on a number of orders to be fulfilled and a number of shoppers available to fulfill orders and outputting a predicted amount of time for a shopper to select an order for fulfillment from the input shopper-order ratio value. As further described above in conjunction with FIG. 5, the selection prediction model 620 is trained by application to various examples of the training data. After training, the selection prediction model 620 is stored by the online concierge system 102. In various embodiments, the selection prediction model 620 is associated with a particular geographic region, and the online concierge system 102 trains and maintains a selection prediction model for different geographic regions.

As further described above in conjunction with FIG. 5, the amount of time between orders being presented to shoppers and a shopper selecting an order for fulfillment provides an indication of a capability of a number of shoppers to fulfill orders, with longer amounts of time indicating that the number of shoppers has difficulty fulfilling the number of orders within times specified by the orders. The online concierge system 102 may leverage the predicted amount of time for a shopper to select an order for fulfillment to evaluate whether a number of shoppers allocated to fulfill orders within a time interval is adequate for fulfillment of orders during the time interval. With the trained selection prediction model 620 stored, the online concierge system 102 identifies a time interval. In various embodiments, the identified time interval occurs later than the earlier time intervals from which information was obtained to train the selection prediction model 620.

For the identified time interval, the online concierge system 102 generates a predicted number of orders 625 to be fulfilled during the identified time interval. As further described above in conjunction with FIG. 5, the online concierge system 102 generates the predicted number of orders 625 to be fulfilled during the identified time intervals from numbers of orders that were fulfilled during the earlier time intervals. In various embodiments, the online concierge system 102 applies a classical time series model to numbers of orders fulfilled during various earlier time intervals to generate the predicted number of orders 625 to be fulfilled during the identified time interval.

Additionally, from interactions 630 by shoppers with a shopper mobile application 212 during earlier time intervals, the online concierge system 102 generates a predicted number of shoppers 635 available to fulfill orders during the identified time interval. In various embodiments, the predicted number of shoppers 635 are determined from a number of unique shoppers who performed a specific interaction with the shopper mobile application 212 during different earlier time intervals. The specific interaction with the shopper mobile application 212 may be accessing the shopper mobile application 212, providing an indication to the online concierge system 102 that a shopper is available to fulfill orders during an earlier time interval via the shopper mobile application 212, or other interactions with the shopper mobile application 212 indicating capability to fulfill orders. The online concierge system 102 may apply a classical time series model to the numbers of unique users who performed the specific interaction with the shopper mobile application 212 during earlier time intervals to generate the predicted number of shoppers 635 available to fulfill orders during the identified time interval in various embodiments. By using interactions with the shopper mobile applications 212 to identify numbers of users for the earlier time intervals, the online concierge system 102 more accurately generates the predicted number of shoppers 635 available to fulfill orders during the identified time interval. Conventional methods that use amounts of time shoppers worked fulfilling orders in time intervals are constrained by a number of orders to be fulfilled during different time intervals, as the number of orders to be fulfilled during a time interval places a limit on the amount of time worked by shoppers; such a limitation may result in the online concierge system 102 under-counting the number of shoppers available by failing to account for shoppers who were available to fulfill orders but who were unable to do so because of limited orders to be fulfilled.

From the predicted number of orders 625 to be fulfilled during the identified time interval and the predicted number of shoppers 635 available to fulfill orders during the identified time interval, the online concierge system 102 generates a shopper-order ratio value for the identified time interval. For example, the shopper-order ratio value for the identified time interval is a ratio of the predicted number of shoppers 635 to the predicted number of orders 625. The shopper-order ratio value for the identified time interval is input to the selection prediction model 620, which generates a predicted amount of time 640 for shoppers to select orders during the identified time interval. Hence, the selection prediction model 620 allows the online concierge system 102 to determine a predicted amount of time 640 for shoppers to select orders for fulfillment based on the predicted number of orders 625 to be fulfilled during the identified time interval and the predicted number of shoppers 635 available to fulfill orders during the identified time interval.

The online concierge system 102 compares 645 the predicted amount of time 640 to a target amount of time to select orders for fulfillment. Based on the comparison, the online concierge system 102 determines whether to modify a number of shoppers allocated for fulfilling orders during the identified time interval. For example, in response to the comparison indicating the predicted amount of time 640 exceeds the target amount of time, the online concierge system 102 determines a supply gap is present during the identified time interval. The supply gap indicates that the predicted number of shoppers 635 is unable to fulfill orders during the identified time interval by times specified by the orders. As further described above, the online concierge system 102 may apply one or more methods to adjust allocation of shoppers to the identified time interval, allowing the online concierge system 102 to mitigate the supply gap by increasing a number of shoppers allocated to fulfill orders during the identified time interval.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method implemented at a computing system, comprising:

determining a predicted number of shoppers available to fulfill orders during an identified time interval by applying a shopper supply model to information describing accesses to a shopper mobile application, from which shoppers select orders, by shoppers during one or more earlier time intervals, wherein the shopper supply model is a first neural network trained to predict a number of shoppers available to fulfill orders during any given time interval by:

accessing first training examples, each first training example including an access pattern to a shopper mobile application by shoppers during a historical time interval labeled with a number of shoppers available to fulfill orders;

applying parameters of the first neural network to the first training examples to predict numbers of shoppers available; and backpropagating to update the parameters of the first neural network to reduce errors between the predicted numbers of shoppers available to fulfill orders and the labeled numbers of shoppers available to fulfill orders;

determining a shopper-order ratio value based on the predicted number of shoppers determined by the shopper supply model and a predicted number of orders for the identified time interval, the predicted number of orders being determined from numbers of orders received by the computing system for fulfillment during the one or more earlier time intervals;

determining a predicted time for the identified time interval between presentation of orders to one or more shoppers and selection of one or more orders by one or more shoppers by applying a selection prediction model to the determined shopper-order ratio value, wherein the selection prediction model is a second neural network trained to predict a time between presentation of orders to one or more shoppers and selection of one or more orders by the one or more shoppers for any given shopper-order ratio by:

accessing second training examples, each second training example including a shopper-order ratio value labeled with a time interval between presentation of an order to one or more shoppers and selection of the order by the one or more shoppers;

applying parameters of the second neural network to the second training examples to predict a time interval between presentation of orders to one or more shoppers and selection of one or more orders by the one or more shoppers; and backpropagating to update parameters of the second neural network to reduce errors between the predicted time interval and the labeled time interval;

adjusting a number of shoppers allocated to fulfilling orders during the identified time interval based on the predicted time for the identified time interval between presentation of orders to one or more shoppers and selection of one or more orders by one or more shoppers; and sending the orders that are to be fulfilled during the identified time interval to client devices associated with the number of shoppers, causing the orders to be displayed at the client devices via the shopper mobile application associated with the number of shoppers.

2. The method of claim 1, further comprising:

identifying a target amount of time between presentation of orders to one or more shoppers and selection of one or more orders by one or more shoppers; and comparing the predicted time for the identified time interval between presentation of orders to one or more shoppers and selection of one or more orders by one or more shoppers to the target amount of time.

3. The method of claim 2, wherein comparing the predicted time for the identified time interval between presentation of orders to one or more shoppers and selection of one or more orders by one or more shoppers to the target amount of time comprises:

determining a target shopper-order ratio value corresponding to the target amount of time;

determining a target number of shoppers for the identified time interval from the target shopper-order ratio value and the predicted number of orders to fulfill during the identified time interval; and comparing the predicted number of shoppers available to fulfill orders during the identified time interval to the target number of shoppers.

4. The method of claim 3, further comprising:

determining whether a supply gap exists during the identified time interval by comparing the predicted time for the identified time interval between presentation of orders to one or more shoppers and selection of one or more orders by one or more shoppers to the target amount of time.

5. The method of claim 4, wherein determining whether the supply gap exists during the identified time interval comprises:

determining the supply gap exists during the identified time interval in response to the predicted number of shoppers available to fulfill orders during the identified time interval being less than the target number of shoppers.

6. The method of claim 1, wherein the information describing accesses to the shopper mobile application, from which shoppers select orders, by shoppers during one or more earlier time intervals comprises information identifying a number of unique shoppers who accessed the shopper mobile application during each of the one or more earlier time intervals.

7. The method of claim 1, wherein the information describing accesses to the shopper mobile application, from which shoppers select orders, by shoppers during one or more earlier time intervals comprises information identifying a number of unique shoppers who performed a specific interaction with the shopper mobile application during each of the one or more earlier time intervals.

8. The method of claim 7, wherein the specific interaction comprises transmitting an indication of availability to fulfill orders to the computing system via the shopper mobile application.

9. The method of claim 1, wherein the shopper-order ratio value based on the predicted number of shoppers and the predicted number of orders for the time interval comprises a ratio of the predicted number of shoppers to the predicted number of orders.

10. The method of claim 1, wherein the predicted number of orders is determined by:

applying a Holt-Winters time series model to numbers of orders received by the computing system for fulfillment during the one or more earlier time intervals.

11. The method of claim 1, wherein the predicted number of orders is determined by:

filtering the one or more earlier time intervals by removing earlier time intervals having one or more specific characteristics; and determining the predicted number of orders to fulfill during the identified time interval based on numbers or orders received by the computing system for fulfillment during the filtered one or more earlier time intervals.

12. A computer program product comprising a non-transitory computer readable storage medium having instructions encoded thereon that, when executed by a processor of a computing system, cause the computing system to perform steps comprising:

determining a predicted number of shoppers available to fulfill orders during an identified time interval by applying a shopper supply model to information describing accesses to a shopper mobile application, from which shoppers select orders, by shoppers during one or more earlier time intervals, wherein the shopper supply model is a first neural network trained to predict a number of shoppers available to fulfill orders during any given time interval by:

accessing first training examples, each first training example including an access pattern to a shopper mobile application by shoppers during a historical time interval labeled with a number of shoppers available to fulfill orders;

applying parameters of the first neural network to the first training examples to predict numbers of shoppers available; and backpropagating to update the parameters of the first neural network to reduce errors between the predicted numbers of shoppers available to fulfill orders and the labeled numbers of shoppers available to fulfill orders;

determining a shopper-order ratio value based on the predicted number of shoppers determined by the shopper supply model and a predicted number of orders for the identified time interval, the predicted number of orders being determined from numbers of orders received by the computing system for fulfillment during the one or more earlier time intervals;

determining a predicted time for the identified time interval between presentation of orders to one or more shoppers and selection of one or more orders by one or more shoppers by applying a selection prediction model to the determined shopper-order ratio value, wherein the selection prediction model is a second neural network trained to predict a time between presentation of orders to one or more shoppers and selection of one or more orders by the one or more shoppers for any given shopper-order ratio by:

accessing second training examples, each second training example including a shopper-order ratio value labeled with a time interval between presentation of an order to one or more shoppers and selection of the order by the one or more shoppers;

applying parameters of the second neural network to the second training examples to predict a time interval between presentation of orders to one or more shoppers and selection of one or more orders by the one or more shoppers; and backpropagating to update parameters of the second neural network to reduce errors between the predicted time interval and the labeled time interval;

adjusting a number of shoppers allocated to fulfilling orders during the identified time interval based on the predicted time for the identified time interval between presentation of orders to one or more shoppers and selection of one or more orders by one or more shoppers; and sending the orders that are to be fulfilled during the identified time interval to client devices associated with the number of shoppers, causing the orders to be displayed at the client devices via the shopper mobile application associated with the number of shoppers.

13. The computer program product of claim 12, further comprising:

identifying a target amount of time between presentation of orders to one or more shoppers and selection of one or more orders by one or more shoppers; and comparing the predicted time for the identified time interval between presentation of orders to one or more shoppers and selection of one or more orders by one or more shoppers to the target amount of time.

14. The computer program product of claim 13, wherein comparing the predicted time for the identified time interval between presentation of orders to one or more shoppers and selection of one or more orders by one or more shoppers to the target amount of time comprises:

determining a target shopper-order ratio value corresponding to the target amount of time;

determining a target number of shoppers for the identified time interval from the target shopper-order ratio value and the predicted number of orders to fulfill during the identified time interval; and comparing the predicted number of shoppers available to fulfill orders during the identified time interval to the target number of shoppers.

15. The computer program product of claim 14, further comprising:

determining whether a supply gap exists during the identified time interval by comparing the predicted time for the identified time interval between presentation of orders to one or more shoppers and selection of one or more orders by one or more shoppers to the target amount of time.

16. The computer program product of claim 15, wherein determining whether the supply gap exists during the identified time interval comprises:

determining the supply gap exists during the identified time interval in response to the predicted number of shoppers available to fulfill orders during the identified time interval being less than the target number of shoppers.

17. The computer program product of claim 12, wherein the information describing accesses to the shopper mobile application, from which shoppers select orders, by shoppers during one or more earlier time intervals comprises information identifying a number of unique shoppers who accessed the shopper mobile application during each of the one or more earlier time intervals.

18. The computer program product of claim 12, wherein the information describing accesses to the shopper mobile application, from which shoppers select orders, by shoppers during one or more earlier time intervals comprises information identifying a number of unique shoppers who performed a specific interaction with the shopper mobile application during each of the one or more earlier time intervals.

19. The computer program product of claim 18, wherein the specific interaction comprises transmitting an indication of availability to fulfill orders to the computing system via the shopper mobile application.

20. A computing system comprising:

a processor; and a non-transitory computer readable storage medium having instructions encoded thereon that, when executed by the processor, cause the computing system to perform steps comprising:

determining a predicted number of shoppers available to fulfill orders during an identified time interval by applying a shopper supply model to information describing accesses to a shopper mobile application, from which shoppers select orders, by shoppers during one or more earlier time intervals, wherein the shopper supply model is a first neural network trained to predict a number of shoppers available to fulfill orders during any given time interval by:

accessing first training examples, each first training example including an access pattern to a shopper mobile application by shoppers during a historical time interval labeled with a number of shoppers available to fulfill orders;

applying parameters of the first neural network to the first training examples to predict numbers of shoppers available; and backpropagating to update the parameters of the first neural network to reduce errors between the predicted numbers of shoppers available to fulfill orders and the labeled numbers of shoppers available to fulfill orders;

determining a shopper-order ratio value based on the predicted number of shoppers determined by the shopper supply model and a predicted number of orders for the identified time interval, the predicted number of orders being determined from numbers of orders received by the computing system for fulfillment during the one or more earlier time intervals;

determining a predicted time for the identified time interval between presentation of orders to one or more shoppers and selection of one or more orders by one or more shoppers by applying a selection prediction model to the determined shopper-order ratio value, wherein the selection prediction model is a second neural network trained to predict a time between presentation of orders to one or more shoppers and selection of one or more orders by the one or more shoppers for any given shopper-order ratio by:

accessing second training examples, each second training example including a shopper-order ratio value labeled with a time interval between presentation of an order to one or more shoppers and selection of the order by the one or more shoppers;

applying parameters of the second neural network to the second training examples to predict a time interval between presentation of orders to one or more shoppers and selection of one or more orders by the one or more shoppers; and backpropagating to update parameters of the second neural network to reduce errors between the predicted time interval and the labeled time interval;

adjusting a number of shoppers allocated to fulfilling orders during the identified time interval based on the predicted time for the identified time interval between presentation of orders to one or more shoppers and selection of one or more orders by one or more shoppers; and sending the orders that are to be fulfilled during the identified time interval to client devices associated with the number of shoppers, causing the orders to be displayed at the client devices via the shopper mobile application associated with the number of shoppers.

* * * * *